(12) United States Patent
Dworakowski et al.

(10) Patent No.: US 12,028,641 B2
(45) Date of Patent: Jul. 2, 2024

(54) SYSTEM INCLUDING A CAMERA MODULE CONNECTED TO AN ELECTRONIC DEVICE

(71) Applicant: Aptiv Technologies AG, Schaffhausen (CH)

(72) Inventors: Waldemar Dworakowski, Cracow (PL); Maciej Krzanowski, Cracow (PL); Lukasz Szpiech, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 312 days.

(21) Appl. No.: 17/460,981

(22) Filed: Aug. 30, 2021

(65) Prior Publication Data

US 2022/0070386 A1 Mar. 3, 2022

(30) Foreign Application Priority Data

Sep. 1, 2020 (EP) .................... 20193963

(51) Int. Cl.
*H04N 5/262* (2006.01)
*G06F 21/44* (2013.01)
*G06F 21/62* (2013.01)

(52) U.S. Cl.
CPC ............. *H04N 5/262* (2013.01); *G06F 21/44* (2013.01); *G06F 21/6209* (2013.01)

(58) Field of Classification Search
CPC .... H04N 5/262; H04N 23/617; H04L 9/3247; H04L 63/0428; H04L 63/123; H04L 2209/84; G06F 21/44; G06F 21/6209; G06F 21/64; G06F 11/1004; H04W 4/48
See application file for complete search history.

(56) References Cited

U.S. PATENT DOCUMENTS

| 8,499,103 | B2 | 7/2013 | Carter et al. |
| 9,692,879 | B1* | 6/2017 | Lack ................... H04L 63/08 |
| 2011/0029733 | A1 | 2/2011 | Adler et al. |
| 2013/0308006 | A1 | 11/2013 | Finnila et al. |
| 2016/0344745 | A1 | 11/2016 | Johnson et al. |
| 2020/0082370 | A1* | 3/2020 | Yang .................. G06Q 20/20 |
| 2020/0106548 | A1* | 4/2020 | Um .................... H04W 72/044 |

FOREIGN PATENT DOCUMENTS

| EP | 1938581 | 7/2008 |
| EP | 2257879 | 11/2013 |
| EP | 3073605 | 9/2016 |
| WO | 2007036756 | 4/2007 |

OTHER PUBLICATIONS

"Extended European Search Report", European Application No. 20193963.4, dated Feb. 16, 2021, 4 pages.

* cited by examiner

*Primary Examiner* — Twyler L Haskins
*Assistant Examiner* — John H Morehead, III
(74) *Attorney, Agent, or Firm* — Harness, Dickey & Pierce, P.L.C.

(57) ABSTRACT

Described is a system including a camera module connected to an electronic device. The camera module includes a non-volatile memory that includes instructions storing a script for setting up the camera module. The electronic device includes an interpreter that executes at least partially the instructions including the script stored in the non-volatile memory of the camera module to set up the camera module.

19 Claims, 1 Drawing Sheet

SYSTEM INCLUDING A CAMERA MODULE CONNECTED TO AN ELECTRONIC DEVICE

CROSS-REFERENCE TO RELATED APPLICATION

This application claims priority to European Patent Application Number 20193963.4, filed Sep. 1, 2020, the disclosure of which is hereby incorporated by reference in its entirety herein.

BACKGROUND

The present disclosure relates to the field of configuring a camera module by a control device to which the camera is connected. Such a system including the camera module and the control device can be used for example in a vehicle.

In a vehicle for example, a camera module can be connected to an ECU (Electronic Control Unit) that controls the operations of the camera module. A camera module needs to be set up when it is connected to the ECU, during startup. More precisely, the ECU must configure the components of the camera module and receive information on the camera like capability information (e.g. its resolution). Generally, the operations of setting up of the camera module are coded in the ECU, during production, typically in a firmware of the ECU, which implies a fixed configuration of the camera module. As a result, the system is inflexible regarding possible later changes of the camera and/or the ECU.

WO2007/036756 A1 discloses an internal storage of camera characteristics during production in a non-volatile memory built-in within the camera module such that the camera characteristics are user by the electronic device for taking processing images or for identifying the camera module.

There is a need is to improve the situation. In particular, there is a need to provide a system that allows setting up a camera module that is connected to a control unit in a more flexible manner regarding the possible future changes of the camera module or the control unit.

SUMMARY

The present disclosure concerns a system including a camera module connected to an electronic device, wherein the camera module comprises a non-volatile memory storing a script that includes instructions for setting up the camera module; and the electronic device comprises an interpreter that executes at least partially the script stored in the storage device of the camera module to set up the camera module.

According to the present disclosure, a storage (e.g. a non-volatile memory) built-in within the connected camera module stores the information on setting up the camera module, in the form of a script defining the actions that, when executed by the electronic device, allow to set up and configure properly the camera module.

The script can comprise first instructions for the electronic device to configure one or more components of the camera module.

The script can also comprise second instructions for the electronic device to use information on the camera module (camera characteristics, calibration data of an image sensor). The information on the camera module can be used by the electronic device to capture and process images and to identify the camera module.

Advantageously, the electronic device comprises an initial setup software component or program for establishing a link between the electronic device and the camera module allowing access to the non-volatile memory, said initial setup software component or program being executed before the script.

For security reasons, the script can comprise: at least one CRC (cyclic redundancy check) value, the electronic device checking the CRC value before executing the script; and/or at least one cryptographic signature, the electronic device verifying the signature before executing the script.

Additionally (or alternatively), at least a part of the script can be encrypted, and the electronic device can decrypt said at least part of the script before executing the script.

In a particular embodiment, the script that is stored in the camera module is divided into a plurality of blocks and each block includes a group of instructions and is protected separately.

Different blocks of the script can correspond respectively to different operational modes of the camera module, and, when an operational mode is selected for the camera module, the electronic device only executes the block that corresponds to the selected operational mode, excluding the other blocks that correspond to the non-selected operational mode.

Advantageously, the script includes a block of initial configuration, and said block of initial configuration is the only block of the plurality of blocks that is encrypted.

The interpreter can execute at least partially the script stored in the storage device of the camera module to set up the camera module, during a camera module startup operation.

The present disclosure also concerns a module for a system as previously defined, including a non-volatile memory storing a script that includes instructions for setting up the camera module by an electronic device of the system, to which the camera module is connected.

The present disclosure also concerns a vehicle integrating the system as previously defined.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

Figure 1:
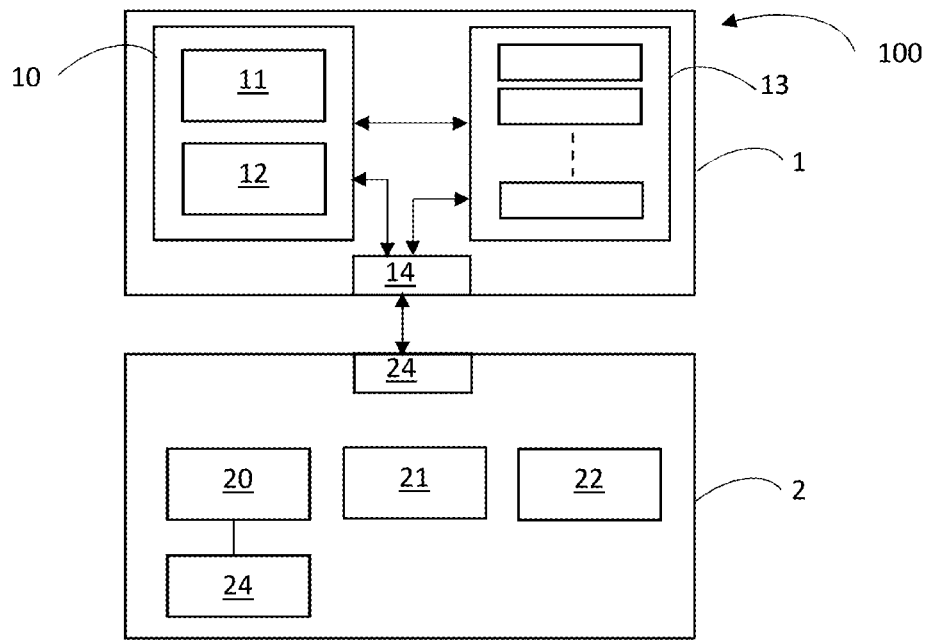
FIG. 1 shows a system including a camera module and an electronic device to which the camera module is connected, according to a specific embodiment.

FIG. 1 shows a system 100 including a camera module 1 and an electronic device 2. Such a system can be integrated in a vehicle for example. In that case, the electronic device 2 can be an ECU (Electronic Control Unit) that controls the camera module 1, and the camera module 1 can capture images of the environment around the vehicle. However, the present disclosure is not limited to this specific example and the camera module can be connected to another electronic device like a communication device.

The camera module 1 includes one or more components. In the described embodiment, the camera module 1 has the two following components, well known by the person skilled in the art: an imager 10 and a serializer 13.

The imager 10 has an image sensor 11 and a non-volatile memory 12, for example an EPROM (erasable programmable read-only memory), that can be integrated on an integrated circuit. The non-volatile memory 12 can store camera module characteristics such as pixel calibration data, sensor parameters, a delay of a mechanical shutter, camera identification data, a manufacturing date, etc. These camera module characteristics are stored in the form of structured data in the non-volatile memory 12.

The serializer 13 can be another integrated circuit. It has a plurality of registers 1

The camera module 1 has also an input and output port 14.

In the present disclosure, the camera module 1 also stores a script that includes instructions for setting up the camera module 1 when it is connected to the electronic device 2. These instructions are adapted to be executed by the electronic device 2 (or by any other electronic device to which the camera module 1 is connected), when the camera module 1 is connected to this electronic device and started. The script can be stored during production of the camera module 1, for example in the non-volatile memory 12 (in addition to the other data stored in this memory 12). Alternatively, the script could be stored in another memory built-in within the camera module, preferably a non-volatile memory.

The instructions of the script define a plurality of actions to be executed by the electronic device 2 in order to set up the camera module 1 when it is connected to the electronic device 2. Typically, the setting up of the camera module 1 is done during each startup operation of the camera module 1 connected to the electronic device 2.

The camera module 1 is configured and set up when it is connected to the electronic device 2 and when the camera module 1 (or the system 100) is started, during a startup operation, for example when starting the vehicle. At this moment, the electronic device 2 needs to perform different actions to configure the camera module 1, typically by writing data into registers of the camera module 1, and to obtain and use information on the camera module 1 (characteristics of the camera module 1). For example, the information on the camera module is needed and used by components, such as software components of the electronic device 2, to take and process images and/or identify the camera module 1. The actions for setting up the camera (i.e. configuring the camera module 1 and providing the information on the camera module 1 to the electronic device 2) will not be detailed in the present disclosure, as these actions are numerous and well-known by the person skilled in the art.

The instructions of the script include first instructions for the electronic device 2 to configure one or more components of the camera module 1 (typically by writing data into registers of the camera module 1) and second instructions for the electronic device 2 to use information on the camera module 1. For example, the first instructions allow the electronic device 2 to set addresses of one or more components of the camera module 1 and addresses of registers in these components, and to write data into these preset registers in the component(s) of the camera module 1. For example, the second instructions allow the electronic device 2 to obtain the structured data stored in the non-volatile memory 12 of the camera module 1, including for example calibration data for the image sensor and other camera module characteristics, and to process this structured data into a suitable form such that it can be used by software components of the electronic device 2.

The script can be divided into a plurality of blocks. These different script blocks can be protected separately. It means that each script block can have its own (independent and separate) protection. Different mechanisms of protection can be used, for example: CRC (cyclic redundancy check), cryptographic signature and/or encryption. Each block can be protected using one or more of these mechanisms of protection.

One script block can be used for an initial configuration of the camera module 1.

Different (e.g., other) script blocks can correspond respectively to different operational modes of the camera module 1, including for example a test mode and different shooting modes. When a given operational mode of the camera module is selected, for example by a user, the electronic device 2 only executes the block that corresponds to the selected operational mode, excluding the blocks corresponding to the non-selected operational modes.

In a particular embodiment, the script block for an initial configuration of the camera module 1 is the only block of the plurality of blocks that is encrypted. In this way, only a selected and limited portion of the script (here, the block for initial configuration) is encrypted. This allows to limit the time required for the electronic device 2 to set up and configure the camera module 1. If the encrypted portion of the script cannot be decrypted successively, the initial configuration of the camera module 1 is not carried out and, consequently, the camera module 1 is made inoperable. The encryption can be an asymmetric encryption or a symmetric encryption.

The script blocks can have a predefined structure. For example, each script block includes a header part of block information, a record part of instructions and a protection part.

The header part contains information on the script block, such as a size (length) of the script block, the indication whether or not the script block is encrypted and/or the type of configuration of the script block (initial configuration or configuration for an operational mode of the camera module 1).

The record part contains records, that contains a group of instructions to be executed by the electronic device 2 to set up and configure the camera module 1.

The protection part can include one or more protection elements such as: a CRC value of the block that allows the electronic device 2 to check the block received from the camera module 1; and/or a cryptographic signature of the block.

The electronic device 2 has an interpreter 20 that is able to execute the script stored in the camera module 1, in order to set up and configure the camera module 1 when it is connected to the electronic device 2, during the camera module startup.

The interpreter 20 can be coded in a software of the electronic device 2, typically in a firmware of the electronic device 2.

The electronic device 2 has also an initial setup software component (a program) 21 for establishing a link between the electronic device 2 and the camera module 1 allowing access to the non-volatile memory 14, this initial setup component being executed before execution of the script.

The electronic device 2 has also a security component 22 (for example a software component), that is able to execute different security operations such as checking the CRC value of a block, verifying the cryptographic signature of a block and decrypting an encrypted block.

The initial set-up component 21 and the security component 22 can be coded in the firmware of the electronic device 2.

The electronic device 2 also has an input and output port 24.

Figure 2:
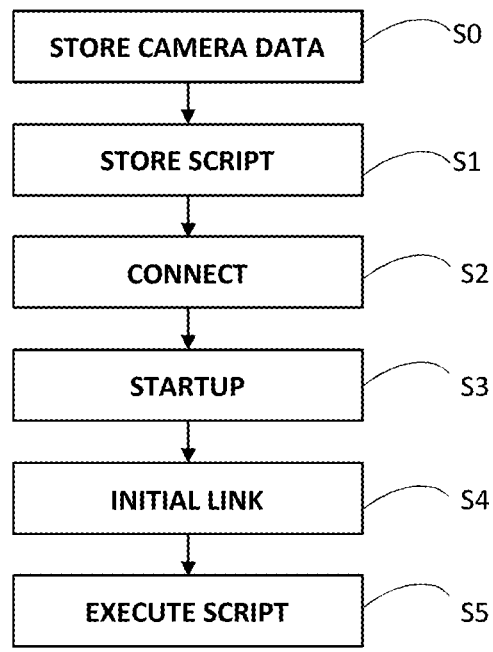
FIG. 2 shows an organigram of a method of configuring the camera module connected to the electronic device, according to a particular embodiment.

An operation of the system 100 will now be described, with reference to FIG. 2.

During production of the camera module 1, the camera module characteristics are stored in the non-volatile memory 12, in the form of structured data, in a step S0. In addition, during production, the script of instructions for setting up and configuring the camera module 1 when it is connected to an electronic device, for example the electronic device 2, is stored in the non-volatile memory 12, in a step S1.

Then, the camera module 1 is connected to the electronic device 2, for example during production of the vehicle, in a step S2.

During a startup operation S3 of the camera module 1 (for example when starting the vehicle), the camera module 1 needs to be set up and configured. At this moment, the electronic device 2 first establishes a link with the camera module 1 to access the data stored in the non-volatile memory 12, by executing the initial setup program, in a step S4.

In a step S5, the electronic device 2 executes at least part of the script that is stored in the camera module 1. The electronic device 2 can execute only the blocks of the script that are required to operate the camera module 1 according to an operational mode selected for example by a user. For example, the block of initial configuration is initially executed and then the block corresponding to a selected operational mode of the camera module 1 is executed. For each script block to be executed, the electronic device 2 performs one or more security operations: check of the CRC value of the block; if present, verification of the signature of the block; if the block is encrypted, decryption of the block.

If the one or more security operations are performed successfully, the electronic device 2 proceeds with executing the instructions of the block to set up and configure the camera module 1, in the step S5.

In the present disclosure, a non-volatile memory 12 built-in within the camera module 1 is used to store the information on setting up the camera module 1 connected to the electronic device 2. Typically, the information on setting up the camera module defines the actions (typically "write" actions in registers of the camera module) that, when executed by the electronic device 2 and run on the camera module 1, set the camera module 1 and the electronic device 2 properly. These setup actions are executed after an initial set up operation using parameters built-in (stored) within the electronic device 2 and allowing access the data stored in the camera module 1.

The information on setting up the camera module 1 includes data in the form of a script of instructions corresponding to the actions to be executed by the electronic device 2 to set up and configure the camera module 1. The script is adapted to be executed by an electronic device (for example the electronic device 2) to which the camera module 1 is connected, regardless of how the electronic device is built. The electronic device only needs to have an interpreter of the script, for example as part of its software (typically its firmware).

The present disclosure allows to solve to problem of inflexible design of the camera module 1. An initial set up is executed to establish a default link between the electronic device 2 and the camera module 1, that allows access the data stored within the camera module. Then, the camera module 1 is set up and configured by the electronic device 2, in a flexible manner, by executing the script stored within the camera module 1 and that can be changed. The components of the camera module 1 (e.g., imager, serializer) are set and various parameters and capabilities of the camera module, with addresses of components, are stored in the script interpreter. Finally, the camera module 1 and the electronic device 2 can work in cooperation based on the hardware abstraction layer set up by the first initial set up and the second flexible set up of the camera module 1.

Furthermore, script protection is provided by one or more protection mechanisms (e.g., CRC, signature, encryption).

What is claimed is:

1. A system comprising:
    a camera module including a non-volatile memory configured to store instructions including a script for setting up the camera module, the script being divided into a plurality of blocks with each block comprising a group of instructions corresponding to a different operational mode of the camera module; and
    an electronic device connected to the camera module and comprising an interpreter configured to set up the camera module by executing a block of the script stored in the non-volatile memory of the camera module that corresponds to a selected operational mode of the camera module without executing any blocks of the plurality of blocks that correspond to a non-selected operational mode of the camera module.

2. The system according to claim 1, wherein the script comprises first instructions that, when executed by the interpreter, cause the electronic device to configure one or more components of the camera module.

3. The system according to claim 2, wherein the script comprises first instructions that, when executed by the interpreter, cause the electronic device to use information on the camera module.

4. The system according to claim 1, wherein the electronic device comprises an initial setup software component configured to establish a link between the electronic device and the camera module to allow access to the non-volatile memory before the interpreter at least partially executes the script.

5. The system according to claim 1, wherein the script comprises at least one cyclic redundancy check value, and the electronic device is configured to check the cyclic redundancy check value before the interpreter at least partially executes the script.

6. The system according to claim 1, wherein the script includes at least one cryptographic signature, and the electronic device is configured to verify the at least one cryptographic signature before the interpreter at least partially executes the script.

7. The system according to claim 1, wherein at least a part of the script is encrypted, and the electronic device is configured to decrypt the part of the script that is encrypted before the interpreter at least partially executes the script.

8. The system according to claim 1, wherein the plurality of blocks include an encrypted block that includes initial configuration information, the encrypted block being the only block of the plurality of blocks that is encrypted.

9. The system according to claim 1, wherein the interpreter is configured to at least partially execute the script stored in the non-volatile memory of the camera module during a camera module startup operation to set up the camera module.

10. The system according to claim 1, wherein the system comprises a vehicle with the electronic device and the camera module integrated in the vehicle.

11. The system according to claim 1, wherein the camera module comprises a camera and the electronic device comprises a control device for the camera.

12. A camera comprising a camera module including a non-volatile memory configured to store instructions including a script for setting up the camera module within a system, the script being divided into a plurality of blocks with each block comprising a group of instructions corresponding to a different operational mode of the camera module, by executing a block of the script with an interpreter of an electronic device that is connected to the camera module, the block of the script corresponding to a selected operational mode of the camera module, and without executing any blocks of the plurality of blocks that correspond to a non-selected operational mode of the camera module.

13. The camera according to claim 12, wherein the script comprises first instructions that, when executed by the interpreter, cause the electronic device to configure one or more components of the camera module.

14. The camera according to claim 13, wherein the script comprises first instructions that, when executed by the interpreter, cause the electronic device to use information on the camera module.

15. The camera according to claim 12, wherein the script comprises at least one cyclic redundancy check value, and the electronic device is configured to check the cyclic redundancy check value before the interpreter at least partially executes the script.

16. The camera according to claim 12, wherein the script comprises at least one cryptographic signature, and the electronic device is configured to verify the at least one cryptographic signature before the interpreter at least partially executes the script.

17. The camera according to claim 12, wherein at least a part of the script is encrypted, and the electronic device is configured to decrypt the part of the script that is encrypted before the interpreter at least partially executes the script.

18. The camera according to claim 12, wherein the plurality of blocks include an encrypted block that includes initial configuration information, the encrypted block being the only block of the plurality of blocks that is encrypted.

19. The camera according to claim 12, wherein at least a part of the script is encrypted, and the electronic device is configured to decrypt the part of the script that is encrypted before the interpreter at least partially executes the script.

* * * * *